United States Patent
Wright

[15] 3,675,750
[45] July 11, 1972

[54] FLEXIBLE CENTRIFUGAL CLUTCH COUPLING

[72] Inventor: John Wright, Baltimore, Md.
[73] Assignee: Koppers Company, Inc.
[22] Filed: Dec. 8, 1970
[21] Appl. No.: 96,019

[52] U.S. Cl....................192/105 BA, 192/103 B, 64/27 NM
[51] Int. Cl..........................................................F16d 23/10
[58] Field of Search...................192/105 BA, 105 CP, 103 B; 64/27 NM, 30 D

[56] References Cited

UNITED STATES PATENTS

| 2,375,909 | 5/1945 | Fawick | 192/105 BA |
| 2,659,219 | 11/1953 | Mosso et al | 64/27 NM |

FOREIGN PATENTS OR APPLICATIONS

| 806,400 | 12/1958 | Great Britain | 192/105 BA |

Primary Examiner—Allan D. Herrmann
Assistant Examiner—Randall Heald
Attorney—Boyce C. Dent, Oscar B. Brumback and Olin E. Williams

[57] ABSTRACT

The centrifugal clutch coupling has an inner hub member with radially extending elongated vanes, and an outer drum member with an inner cylindrical surface. Engaging shoes are positioned between the inner hub member and outer drum member and have arcuate external surfaces with a friction material secured thereto. The engaging shoes have inwardly extending elongated vanes positioned between the radially outwardly extending vanes of the inner hub member. Elongated elastomeric members are positioned between the inwardly extending vanes of the engaging shoes and the outwardly extending vanes of the inner hub member. The elastomeric members are maintained in position between the elongated vanes by end walls secured in one embodiment to the inner hub member and in another embodiment to the engaging shoes. Torque is transmitted from the inner hub member to the outer drum member through frictional engagement of the friction material on the arcuate external surface of the engaging shoes to the inner cylindrical surface of the outer drum member. The torque is further transmitted through the elastomeric members. In another embodiment, an elastomeric member having an elliptical configuration in section is secured to an engaging shoe and positioned between the radially extending vanes of the inner hub member. Torque is transmitted through the elliptically shaped elastomeric member without the engaging shoe having inwardly extending elongated vane members. Still another embodiment includes elastomeric members preloaded to exert a predetermined amount of force between the inner hub member and the engaging shoes.

14 Claims, 11 Drawing Figures

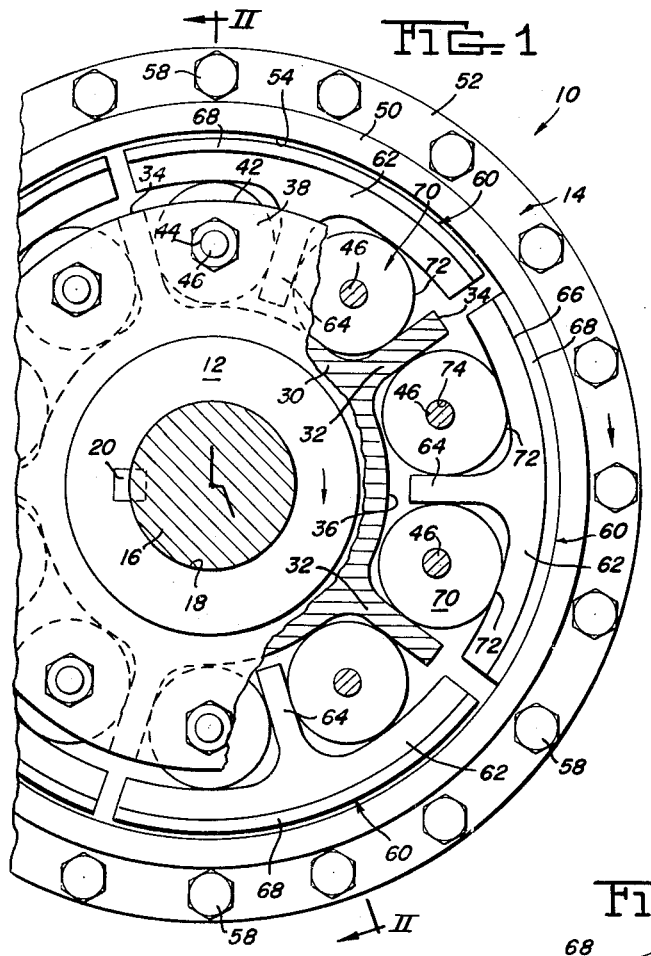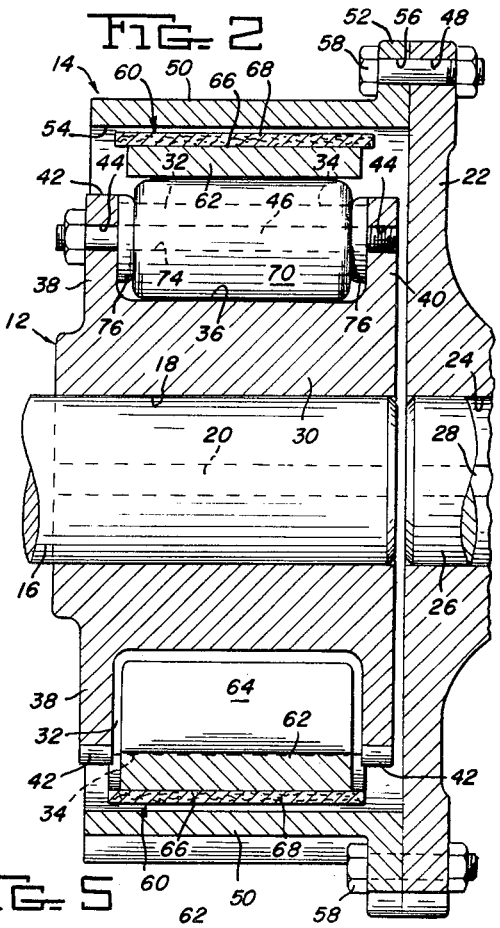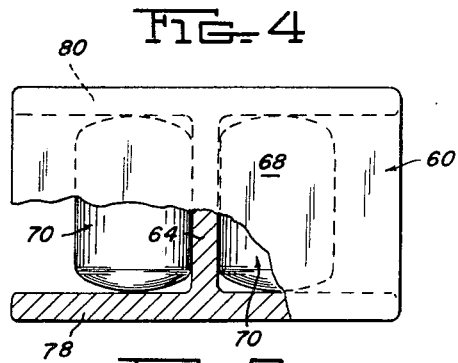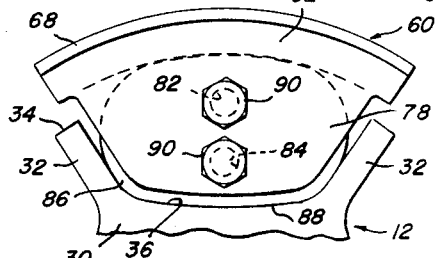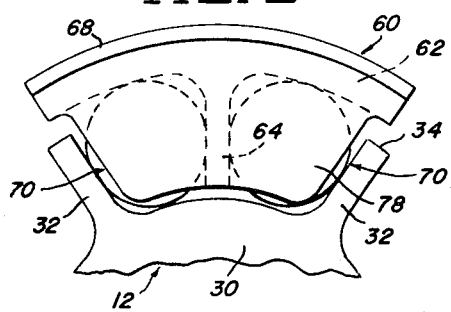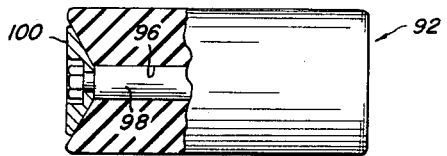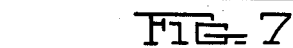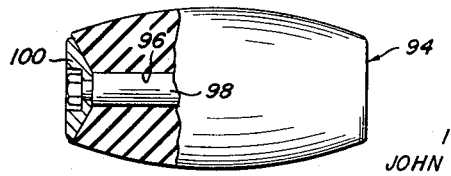
INVENTOR
JOHN WRIGHT
his Attorney INVENTOR.
JOHN WRIGHT
BY
his Attorney

FLEXIBLE CENTRIFUGAL CLUTCH COUPLING

BACKGROUND OF THE INVENTION

1. Field of the Invention

This invention relates to a centrifugal coupling and more particularly to a centrifugal coupling in which torque is transmitted through elastomeric members.

2. Description of the Prior Art

The known centrifugal clutch relies upon centrifugal force for its torque transmission capability. Torque is transmitted from an inner driving hub through a number of engaging shoes to an outer driven drum. The engaging shoes have arcuate friction surfaces that engage the inner cylindrical surface of the outer driven drum and transmit torque from the inner hub to the outer drum. The slip torque capacity of the centrifugal clutch type coupling is the torque at which slipping of the shoes relative to the outer drum starts. The centrifugal clutch has a slip torque proportional to speed squared and a slip horsepower proportional to speed cubed.

The principal applications of the centrifugal clutch are with engines, reciprocating compressor drives and electric motors where substantially no load starting conditions are desired. Until the clutch connected to the motor has attained a given speed, little, if any, torque is transmitted to the driven member so that the motor, particularly a squirrel cage electric motor, may accelerate to a speed where it is generating maximum useful torque before the driven member is frictionally engaged through the clutch member. The centrifugal clutch also provides relatively smooth acceleration of the driven machine because of the slip characteristics of the clutch.

In the past, with the exception of a clutch shown in U.S. Pat. No. 2,588,482, all centrifugal clutches known to the inventor have metal contact between the engaging shoes and the radially extending portions of the inner hub member. The metal to metal contact between the shoes and the inner hub limits substantially the application of the centrifugal clutch coupling. With metal to metal contact, little, if any, misalignment is possible between the inner hub member and the outer drum member.

The coupling described in U.S. Pat. No. 2,588,482 has elongated elastomeric bushings that have inner and outer sleeves with an elastomeric annular member bonded to each of the sleeves. The integral bushing is pressed into bored holes in the driven hub member and in the engaging shoe. Steel links connect the inner sleeves of the driving hub and the shoe bushings. With this arrangement there is a direct connection between the driving hub and the engaging shoes with elastomeric annular members between the metallic link connecting the respective members.

The engaging shoes of a centrifugal clutch transmit torque to the drum by means of friction surfaces. The friction force between the shoes and drum is a function of the centrifugal force which acts upon the shoes when the driving hub is rotated. If the line of action of the force transmitted from the hub to the shoes is not normal to a line passing through the center of gravity of the shoe and its center of rotation, a servo angle effect between the members is obtained. This results in a radial component of the servo angle acting as an additional force pressing each shoe against the drum. The effective torque is a function of the sum of the radial forces pressing the shoes against the drum.

There is a need for a centrifugal clutch type coupling that has an elastomeric connection between the driving and driven members to provide torsional resilience and misalignment capacity and to permit bi-directional operation where the clutch is capable of transmitting torque in either direction and a centrifugal clutch which is capable of damping torsional vibrations and to have the added frictional force between the friction surfaces because of the servo angle effect.

SUMMARY OF THE INVENTION

The present invention relates to a centrifugal clutch that has an inner hub member concentrically connected to a prime mover such as an electric motor, diesel engine or the like. An outer cylindrical drum member is coaxially positioned on the inner hub member and is suitably connected to a driven member such as a gear box, compressor or a pump or the like. The inner hub member has a plurality of peripherally spaced radially outwardly extending vanes and the outer drum member has an inner cylindrical engaging surface. A plurality of engaging shoes are positioned between the inner hub and outer drum member. The engaging shoes have an arcuate outer friction surface and an inwardly extending vane member alternately positioned between radially outwardly extending vanes of said inner hub member. Elastomeric members are positioned between said vane members and are arranged to transmit torque from said inner hub member through said engaging shoes to said outer drum. The elastomeric members permit misalignment between the hub and drum members, and damp vibrations.

An alternate embodiment includes engaging shoes having a plurality of inwardly extending vane members. Radially outwardly extending vanes of the inner hub member are alternately positioned with the inwardly extending vanes of the engaging shoes.

Elastomeric members positioned between the alternating vane members may, if desired, be preloaded to exert a predetermined force between the hub and shoes. Such preloading force may be varied to control the transmission of torque with respect to the rotational speed of the clutch. Changes in configuration of the hub and the shoes may be utilized to create either a preload providing higher torque particularly at low revolutions per minute (rpm), or a preload for delaying the transmission of torque until the rpm of the hub member is increased.

Accordingly, the principal object of this invention is to provide a centrifugal clutch with resilient deformable connections between the components to reduce vibrations therebetween.

Another object of this invention is to provide a centrifugal clutch that remains operative under greater misalignment than heretofore known centrifugal clutches.

A further object of this invention is to provide a centrifugal clutch with resilient deformable connections provided to create preloading between the components so as to control the initial transmission of torque with respect to the rotational speed of the clutch.

These and other objects and advantages of this invention will be more completely disclosed and described in the following specification, the accompanying drawings and the appended claims.

BRIEF DESCRIPTION OF THE DRAWINGS

FIG. 1 is a view in front elevation and partially in section illustrating for descriptive purposes one of the engaging shoes in a disengaged position and another of the engaging shoes in an engaged position with the elastomeric members therebetween distorted to transmit motion from the driving hub member to the driven drum member.

FIG. 2 is a view in section taken along the lines II—II of FIG. 1.

FIG. 3 is a fragmentary view in front elevation of another embodiment illustrating the positioning means for the elastomeric members secured to and depending from the engaging shoes.

FIG. 4 is a top plan view partially in section of the embodiment illustrated in FIG. 3 illustrating the manner in which the elastomeric members are substantially enclosed by the engaging shoes.

FIG. 5 is a view in front elevation illustrating the engaging shoe having depending end portions with an elongated elastomeric member secured therebetween and between the radially extending vanes of the inner driving hub member.

FIG. 6 is a fragmentary view partially in section of an elastomeric member having bolted end housings.

FIG. 7 is a view similar to FIG. 6 illustrating another configuration of the elastomeric member with the bolted end housings.

DESCRIPTION OF THE PREFERRED EMBODIMENT

Figure 8:
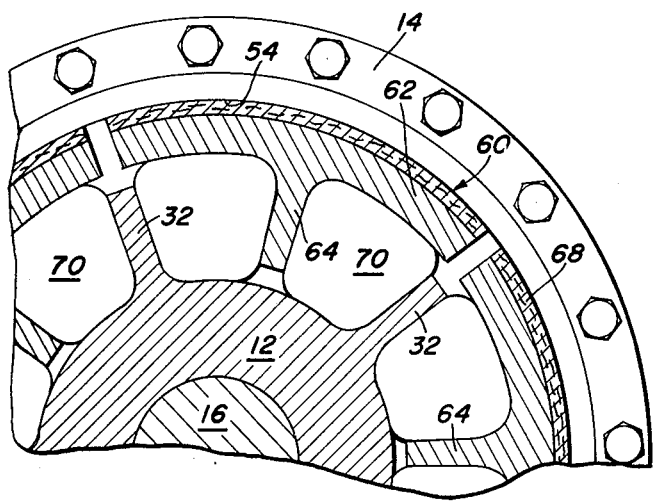
FIG. 8 is a partial front elevation of an alternate embodiment illustrating engaging shoes preloaded to cause higher torque particularly at low rpm.

Referring to the drawings and particularly FIGS. 1 and 2 there is illustrated a centrifugal clutch coupling generally designated by the numeral 10 that has an inner hub member 12 and an outer drum member 14 coaxially positioned on the inner hub member 12. A shaft 16 is nonrotatably secured in an axial bore 18 of the inner hub member 12 by means of the key connection 20 to transmit rotation from a prime mover such as an engine, motor or the like through shaft 16 to the inner hub member 12. The outer drum member 14 has a rear plate member 22 with an axial bore 24 therethrough. A driven shaft 26 is nonrotatably connected to the plate 22 by means of the key connection 28. Thus, rotation of the driven drum member 14 transmits rotation through the plate member 22 to the driven shaft 26. As illustrated in FIG. 2, the bores 18 and 24 of hub member 12 and drum 14 respectively, are aligned and the shafts 16 and 26 positioned therein are also coaxially aligned. It should be understood, however, as later explained, that coaxial misalignment between the hub 12 and drum 14 may take place without damaging the components and coaxial misalignment of the shafts 16 and 26 is possible while the coupling is transmitting torque from a driving member to a driven member.

The inner hub member 12 has a body portion 30 with a plurality of radially extending vane members 32 terminating in radial edge portions 34. The body portion 30 has an arcuate external surface 36 between the vane members 32. The body portion 30 has a pair of radially extending lateral end flanges 38 and 40 that have a peripheral edge portion 42 in substantial alignment with vane edge portion 34. The end flanges 38 and 40 have a plurality of spaced apertures 44 therein. The apertures 44 in flange 40 are preferably threaded to receive the threaded end portion of bolt 46.

The outer drum member 14 has a plate member 22 with a plurality of connecting apertures 48 therethrough. A cylindrical body portion 50 has a radially extending outer flange 52 and an inner cylindrical surface 54. The body portion 50 is coaxially positioned on the inner hub member 12 and has a plurality of bolt apertures 56 that mate with the apertures 48 in plate member 22. Bolts 58 secure the member 50 to the plate member 22 so that rotation and torque is transmitted through body portion 50 to plate 22 and shaft 26. If desired, drum 14 and plate 22 may be provided as a single, unitary member.

Positioned between the inner hub member 12 and the outer drum member 14 are a plurality of engaging shoes generally designated by the numeral 60 that have an arcuate body portion 62 with a radially inwardly extending vane member 64 and an arcuate external surface 66. A friction facing 68 similar to conventional brake lining is secured to the arcuate outer surface 66. The friction facing 68 is arranged to frictionally engage the inner cylindrical surface 54 of the outer drum member 14. The engaging shoes 60 may be so dimensioned that in a static condition of the driving hub member 12 the friction facing 68 is spaced from the inner cylindrical surface 54 of outer drum member 14. The spacing therebetween is illustrated in the upper portion of FIG. 2 and in the upper right quadrant of FIG. 1.

The inwardly extending vanes 64 of the engaging shoes 60 extend between the radially outwardly extending vanes 32 of the inner driving hub member 12. Elastomeric members generally designated by the numeral 70 are positioned between the radially inwardly extending vane member 64 and the radially outwardly extending vane members 32. The elastomeric members are fabricated of a flexible material such as natural or synthetic rubber or other polymeric material that exhibits the flexible properties of rubber. The elastomeric member 70 in a relaxed condition as illustrated in the upper right quadrant of FIG. 1 and the upper portion of FIG. 2, has a generally cylindrical configuration in section with a cylindrical outer surface 72 and an inner axial bore 74. A bolt 46 extends through the aperture 44 in the outer flange member 38 and through the axial bore 74 in the elastomeric member 70 and is secured in the threaded bore 44 of flange 40. Washers 76 are positioned between the flange members 38 and 40 and the end portions of elastomeric members 70. With this arrangement the elastomeric members 70 are maintained in position relative to the inner hub member 12 by the radially extending flanges 38 and 40 on the hub member 12 and the flange members 38 and 40 also serve as torque transmitting components. Although the flange members 38 and 40 are illustrated as being integral with the hub member 12, it should be understood they may be separate ring members positioned in overlying relations with the hub member to maintain the elastomeric members 70 properly positioned between the respective adjacent inwardly extending vane 64 and outwardly extending vane 32. As separate rings the positioning members 38 and 40 would not serve as torque transmitting members since in that case the hub vane members 32 transmit the torque.

The flexible clutch coupling 10 above described operates in the following manner. The shaft 16 is driven by a prime mover such as a motor, engine or the like and in turn rotates the inner hub member 12. The rotation of inner hub member 12 is transmitted to the engaging shoes 60 through the elastomeric members 70. The radially extending vanes 32 on the inner hub member 12 transmit torque through the elastomeric members 70 to the inwardly extending vane 64 on the engaging shoes 60. When the inner hub member 12 reaches a predetermined speed the centrifugal force exerted on the engaging shoes 60 urges the engaging shoes 60 outwardly against the inner cylindrical surface 54 of outer drum 14 where the frictional surface 68 engages the inner cylindrical surface 54 of drum 14. Above a preselected speed of hub member 12 the torque exerted on hub member 12 by shafts 16 is transmitted through the hub 12, engaging shoes 60 to the outer drum 14 and to the shaft 26 connected thereto. When the inner hub member 12 is transmitting torque to the outer drum 14, the spacing between inner hub vanes 32 and shoe vanes 64 by elastomeric members 70 provides the previously discussed servo angle effect between the driving member and driven member.

Referring to FIGS. 3 and 4, where similar numerals will designate similar parts, the elastomeric members 70 are maintained in position between the radially outwardly extending vanes 32 on hub 12 and the radially inwardly extending vanes 64 on the engaging shoes 60 by depending flanges 78 and 80 on the engaging shoes 60. As is illustrated partially in section in FIG. 4 and in FIG. 3, the elastomeric members 70 are preferably enclosed by the engaging shoes. Torque is transmitted from the inner hub member 12 to the outer drum member 14 in a similar manner as the centrifugal clutch 10 previously described. In the embodiment illustrated in FIGS. 3 and 4 the radially extending flange members 38 and 40 on the inner hub member 12 and the elongated bolt members 46 are eliminated. In lieu thereof, radially extending flanges 78 and 80 are provided on the engaging shoes 60.

Referring to FIG. 5 there is illustrated an engaging shoe 60 with the depending flanges 78 and 80 discussed in relation to FIGS. 3 and 4. The depending flanges 78 and 80 have aligned pairs of bolt holes 82 and 84 therebetween. An elastomeric member 86 is positioned between the radially extending vanes 32 of the inner hub member 12 and has a generally elliptical configuration in elevation so that the outer surface 88 of the elastomeric member 86 abuts the external surface 36 of the hub member body portion 30 and the side walls of the radially extending vanes 32. Bolts 90 extend through suitable apertures in the elastomeric material and secure the elliptically shaped elastomeric member 86 to the engaging shoes 60. When the engaging shoe 60 is positioned as illustrated in FIG. 5, torque is transmitted from the radially extending vanes 32 through the elastomeric material 86 directly to the shoe body portion 62. The configuration of the elastomeric material 86 as illustrated in FIG. 5 eliminates the radially inwardly extending vane member 64 on the engaging shoe 60 and provides for centrifugal engagement between the respective hub and drum members.

In FIGS. 6 and 7 there are illustrated elastomeric members 92 and 94. The elastomeric member 92 has a generally cylindrical configuration with an internal bore 96. A bolt 98 extends through the cylindrical bore 96 and end housings 100 are connected to the bolt 98 to limit the axial deflection of the elastomeric material under torque transmitting conditions of the coupling. The embodiment illustrated in FIG. 7 is similar to that illustrated in FIG. 6 in that the elastomeric member 94 has an axial bore 96 with a bolt 98 extending therethrough securing end housings 100 to the elastomeric member 94. The external surface of the elastomeric member 94 is generally barrel shaped as illustrated in FIG. 7 in a relaxed condition and distorts when subjected to torque between the inwardly extending vanes 64 and outwardly extending vanes 32 of the coupling 10.

Figure 11:
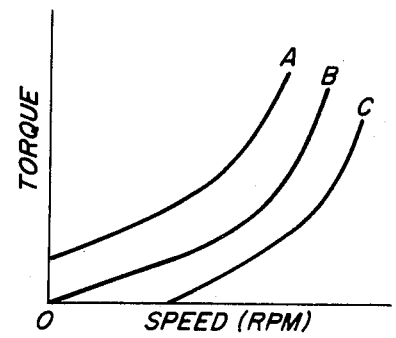
FIG. 11 is a graph for illustrating the relationship of torque and speed (rpm) as represented by the various embodiments of this invention.

If desired, elastomeric members may be preloaded to exert a predetermined force between the inner hub 12 and the engaging shoes 60. Such preloading force may be varied to control the initial transmission of torque from hub 12 to drum 14 with respect to the rotational speed of the clutch. Changes in configuration between hub 12 and engaging shoes 60 may be utilized to create a preload providing higher initial torque at low rpm as accomplished by the embodiment of FIG. 8 and graphically illustrated as line A in FIG. 11. Also, other preload embodiments such as those shown in FIGS. 9 and 10 may delay the initial transmission of torque between hub 12 and drum 14 until the rpm is increased, see line C in FIG. 11. Line B, FIG. 11, illustrates the non-preloading condition as shown in FIG. 1 and previously described herein. Torque and rpm value are zero initially, and torque increases in proportion to rpm squared.

Preloading may be accomplished by forcing oversized elastomeric members 70 in undersized cavities formed between the radially inwardly extending vane members 64 of shoes 60 and the radially outwardly extending vane members 32 of hub 12. However, if desired, elastomeric members 70 may be preloaded due to axial compression of the members by adjustable means or the like. For example, the configuration shown in FIG. 6 may be modified so that when end housings 100 are connected by bolt 98, the axial dimension of elastomeric member 70 is reduced thus increasing the radial dimensions of the elastomeric member to the general configuration shown in FIG. 7. In this manner, the desired amount of preload may be substantially controlled and assembly made easier.

FIG. 8 illustrates the utilization of preloading to create initial torque transmission between hub 12 and drum 14 at zero and low rpm. Elastomeric members 70, forced into cavities between alternating hub vane members 32 and shoe vane members 64 urge shoes 60 radially outwardly against inner cylindrical surface 54. Therefore, when prime mover shaft 16 is rotated, inner hub 12 is operable to transmit torque through elastomeric members 70 to engaging shoes 60 which are already in frictional engagement with inner cylindrical surface 54 of drum 14. As the rpm value increases, centrifugal force causes increased frictional engagement between shoes 60 and inner surface 54 thus increasing the torque transmitted to drum 14, see line A, FIG. 11.

Figure 9:
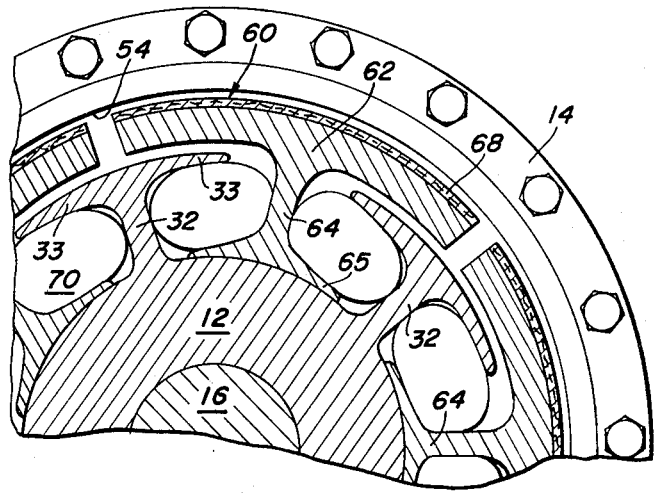
FIG. 9 is a partial front elevation of an alternate embodiment illustrating engaging shoes preloaded for delaying the transmission of torque until the clutch rpm is increased.

FIG. 9 illustrates the utilization of preloading to create a delay in torque transmission between hub 12 and drum 14 with respect to the rpm of the clutch. Radially outwardly extending hub vane members 32 are arcuately extended to include flange 33 and radially inwardly extending shoe vane members 64 include flange 65. Thus the alternating vanes and flanges form an interlocking configuration generally comprising hub 12 and shoes 60. As a result, when elastomeric members 70 are forced within the cavities created by each hub vane member and the adjacent engaging shoe vane member, the radially opposed flanges 33 and 65 tend to urge shoes 60 radially inwardly away from the inner cylindrical surface 54 of drum 14. In this manner, no initial transmission of torque occurs between hub 12 and drum 14 since shoes 60 do not contact inner cylindrical surface 54. As the rpm value is increased however, centrifugal force urges shoes 60 into engagement with inner surface 54 and as the engagement force therebetween is increased, torque is eventually transmitted to drum 14, see line C, FIG. 11.

Figure 10:
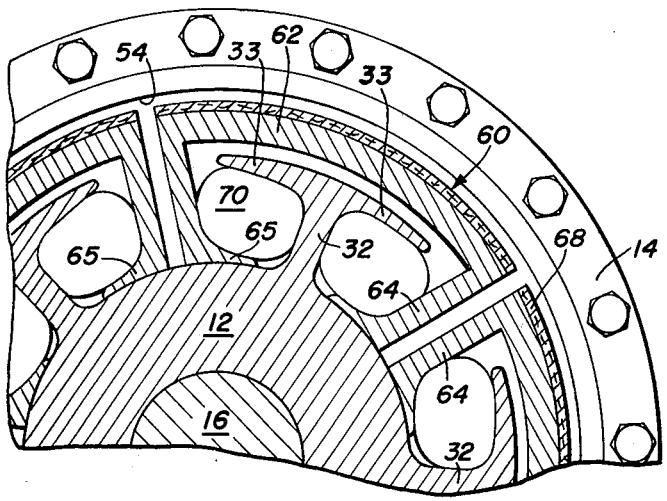
FIG. 10 is a partial front elevation of another alternate embodiment illustrating engaging shoes preloaded for delaying torque transmission as described in FIG. 9.

Similarly, FIG. 10 illustrates an alternate embodiment for utilizing preloading to create a delay in torque transmission between hub 12 and drum 14 with respect to the rpm of the clutch. Radially outwardly extending hub vane members 32 are arcuately extended to include flange 33 and each shoe 60 includes a plurality of spaced radially inwardly extending vane members 64 including flanges 65, as opposed to the single vane members 64 of each shoe 60 shown in previous embodiments. Engaging shoe vane members 64 and hub vane members 32 are symmetrically disposed about inner hub member 12. Thus the alternating vanes and flanges form an interlocking configuration generally comprising hub 12 and shoes 60. As a result, when elastomeric members 70 are forced within the cavities created by each hub vane member and the adjacent engaging shoe vane members, the radially opposed flanges 33 and 65 tend to urge shoes 60 radially inwardly away from inner cylindrical surface 54 of drum 14 as previously described for the configuration shown in FIG. 9 and graphically illustrated as line C, FIG. 11.

It will be apparent from the previous description that my centrifugal clutch with the elastomeric connections between the driving hub and the engaging members eliminates the problems present in centrifugal clutches having metal to metal contact between the respective drive and driven members. The elastomeric members permit misalignment between the components and function to damp vibrations often present.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:
1. A centrifugal clutch comprising:
an inner hub member adapted for concentric connection with a prime mover and including an outer surface having a plurality of circumferentially spaced vane members extending radially therefrom;
an outer drum member coaxially positioned about said inner hub member, said outer drum member having an inner cylindrical surface;
a plurality of engaging shoes positioned at equally spaced circumferential intervals between said inner hub member and said outer drum member, said shoes including an arcuate surface coaxially described within said inner cylindrical surface of said drum and a radially inwardly extending vane member disposed between adjacent ones of said inner hub vane members; and
elastomeric members positioned between said inner hub member and said outer drum member in abutting relationship with adjacent ones of said engaging shoe vane members and said inner hub vane members, one of said inner hub member and said engaging shoes including radially extending and axially spaced end flanges arranged to abut the ends of said elastomeric members to maintain the same between said inner hub member and said engaging shoes, whereby, upon rotation of said prime mover, said inner hub member is operable to transmit torque through said elastomeric members to said engaging shoes, said arcuate surface of said engaging shoes operable to frictionally engage said inner cylindrical surface of said drum and transmit torque from said engaging shoes to said outer drum member.

2. The centrifugal clutch of claim 1 wherein said axially spaced end flanges are formed substantially adjacent the ends of said inner hub member and extend radially outward from said outer surface.

3. The centrifugal clutch of claim 1 wherein said axially spaced end flanges are formed substantially adjacent the ends of said engaging shoes and extend radially inwardly from said arcuate surface.

4. The centrifugal clutch of claim 2 wherein:

said end flanges include a plurality of bolt passages spaced therearound, said elastomeric members have a generally cylindrical configuration in elevation with an axial bolt passage therethrough, and bolt members extend through said passages to secure said elastomeric members to said inner hub member so that said elastomeric members transmit torque directly to said engaging shoes.

5. The centrifugal clutch of claim 3 wherein:

said end flanges of each of said engaging shoes includes a pair of bolt passages extending therethrough, said elastomeric members have a generally cylindrical configuration in elevation and have at least one bolt passage therethrough, and bolt members extend through said passages to secure said elastomeric members to said engaging shoes so that said elastomeric members transmit torque directly to said engaging shoes.

6. The centrifugal clutch of claim 3 wherein:

said engaging shoe vane members comprise a pair of radially spaced bolt members extending axially through said axially spaced end flanges on said engaging shoes, said elastomeric members have a generally elliptical configuration in elevation with a pair of radially spaced longitudinal passages therethrough, said elastomeric members are positioned between said end flanges of said engaging shoes with said pairs of longitudinal passages aligned with said bolt members, to secure said elliptical elastomeric members to said engaging shoes.

7. The centrifugal clutch of claim 1 wherein said elastomeric members are preloaded to exert a predetermined force between said inner hub member and said engaging shoes for urging said engaging shoes radially outward against said inner cylindrical surface of said drum.

8. The centrifugal clutch of claim 2 wherein:

said inner hub member vane members include arcuately extended flange members overlying adjacent ones of said elastomeric members, said engaging shoe vane members include arcuately extended flange members overlying adjacent ones of said elastomeric members substantially opposite said arcuately extended flange members on said inner hub member vane members, for urging said engaging shoes radially inwardly away from said inner cylindrical surface of said drum member.

9. The centrifugal clutch of claim 8 wherein said elastomeric members are preloaded to exert a predetermined force urging said engaging shoes away from said inner cylindrical surface of said drum member.

10. The centrifugal clutch of claim 2 wherein:

each of said engaging shoes includes a pair of circumferentially spaced and radially inwardly extending vane members symmetrically disposed about a corresponding vane member on said inner hub member, said engaging shoe vane members include arcuately extended flange members overlying adjacent elastomeric members, said inner hub member vane members include arcuately extended flange members overlying said elastomeric members substantially opposite said arcuately extending flange members on said engaging shoe vane members, for urging said engaging shoes radially inwardly away from said inner cylindrical surface of said drum member.

11. The centrifugal clutch of claim 10 wherein said elastomeric members are preloaded to exert a predetermined force urging said engaging shoes away from said inner cylindrical surface of said drum member.

12. The centrifugal clutch of claim 1 wherein each of said engaging shoes includes a friction material secured to said arcuate surface for frictional engagement with said inner cylindrical surface of said drum.

13. The centrifugal clutch of claim 1 wherein:

said elastomeric members have a generally cylindrical configuration in elevation with an axial bolt passage extending longitudinally therethrough, bolt members extend through said bolt passage and through end housings at both ends of said elastomeric members, and the effective length of said bolt members is adjustable to provide a predetermined amount of preloading to said elastomeric members.

14. The centrifugal clutch of claim 13 wherein said cylindrical elastomeric members are substantially barrel-shaped along their length.

* * * * *